United States Patent [19]
Schell

[11] Patent Number: 5,824,413
[45] Date of Patent: Oct. 20, 1998

[54] SECONDARY COATING FOR FIBER STRANDS, COATED STRAND REINFORCEMENTS, REINFORCED POLYMERIC COMPOSITES AND A METHOD OF REINFORCING A POLYMERIC MATERIAL

[75] Inventor: Philip L. Schell, Pittsburgh, Pa.

[73] Assignee: PPG Industries, Inc., Pittsburgh, Pa.

[21] Appl. No.: 679,777

[22] Filed: Jul. 15, 1996

[51] Int. Cl.⁶ ..................................... D02G 3/00
[52] U.S. Cl. .................. 428/378; 428/375; 428/392; 428/394; 428/395
[58] Field of Search .................. 428/392, 378, 428/375, 394, 395

[56] References Cited

U.S. PATENT DOCUMENTS

| | | | |
|---|---|---|---|
| 3,654,370 | 4/1972 | Yeakey ..................................... | 260/584 |
| 3,676,287 | 7/1972 | Flautt et al. ............................ | 161/140 |
| 3,803,069 | 4/1974 | McWilliams et al. ........... | 260/29.2 TN |
| 3,840,426 | 10/1974 | Flautt et al. ............................ | 428/295 |
| 3,882,090 | 5/1975 | Fagerburg et al. ..................... | 528/339 |
| 4,074,988 | 2/1978 | Eilerman et al. ............................ | 65/3 |
| 4,147,833 | 4/1979 | Eilerman et al. ....................... | 428/378 |
| 4,265,704 | 5/1981 | Nahta ..................................... | 162/156 |
| 4,330,444 | 5/1982 | Pollman .................................. | 523/404 |
| 4,457,785 | 7/1984 | Hsu et al. ............................ | 106/308 N |
| 4,461,804 | 7/1984 | Motsinger et al. ..................... | 428/288 |
| 4,465,500 | 8/1984 | Motsinger et al. ..................... | 65/3.43 |
| 4,477,524 | 10/1984 | Brown et al. ............................ | 428/391 |
| 4,536,447 | 8/1985 | Hsu ........................................ | 428/392 |
| 4,592,956 | 6/1986 | Gaa et al. ................................ | 428/391 |
| 4,615,946 | 10/1986 | Temple .................................... | 428/361 |
| 4,626,289 | 12/1986 | Hsu .................................... | 106/287.34 |
| 4,681,658 | 7/1987 | Hsu et al. ............................... | 162/156 |
| 4,681,802 | 7/1987 | Gaa et al. ................................ | 428/288 |
| 4,752,527 | 6/1988 | Sanzero et al. ......................... | 428/391 |
| 4,762,750 | 8/1988 | Girgis et al. ............................. | 428/378 |
| 4,762,751 | 8/1988 | Girgis et al. ............................. | 428/378 |
| 4,810,576 | 3/1989 | Gaa et al. ................................ | 428/391 |
| 5,182,784 | 1/1993 | Hager et al. ............................. | 385/128 |
| 5,197,202 | 3/1993 | Jensen ........................................ | 34/23 |
| 5,229,202 | 7/1993 | Tomono et al. ......................... | 428/288 |
| 5,393,379 | 2/1995 | Parrinello ................................ | 162/101 |
| 5,437,928 | 8/1995 | Thimons et al. ........................ | 428/391 |

FOREIGN PATENT DOCUMENTS

| | | |
|---|---|---|
| 4-241917 | 8/1992 | Japan . |
| WO 94/00418 | 1/1994 | WIPO . |

OTHER PUBLICATIONS

Hawley's Condensed Chemical Dictionary, (12th E. 1993), pp. 15, 435, 461, 683, 815, 1075.
Kirk–Othmer, Encyclopedia of Chemical Technology, (1968) vol. 1, pp. 203–204, 224–254, vol. 21, pp. 56–69.
Encyclopedia of Polymer Science and Technology, (1969) vol. 11, pp. 506–563, vol. 6, (1967) pp. 505–712.
K. Whitten et al, General Chemistry, (1981), p. 1992.
K. Loewenstein, The Manufacturing Technology of Continuous Glass Fibres, (3d Ed. 1993), pp. 165–172, 219–222, 237–289, (2d Ed. 1983), pp. 29, 33–45, 47–60, 118–120, 122–125.
Handbook of Plastic Materials and Technology, pp. 955–1062, 1179–1215, 1225–1271, undated.

*Primary Examiner*—Patrick Ryan
*Assistant Examiner*—J. M. Gray
*Attorney, Agent, or Firm*—Ann Marie Odorski

[57] ABSTRACT

The present invention provides aqueous coating compositions adapted to coat a fiber strand having thereon a sizing composition. The aqueous coating compositions include a urethane-containing polymer and a polymer prepared by addition polymerization of a monomer selected from the group consisting of acrylic acid, methacrylic acid and a mixture thereof. Also provided by the present invention are sized fiber strands coated with the secondary coating composition and composites reinforced with the same.

24 Claims, 1 Drawing Sheet

SECONDARY COATING FOR FIBER STRANDS, COATED STRAND REINFORCEMENTS, REINFORCED POLYMERIC COMPOSITES AND A METHOD OF REINFORCING A POLYMERIC MATERIAL

FIELD OF THE INVENTION

This invention relates generally to reinforcements for composites and, more specifically, to sized fiber strands having a secondary coating including polyurethane and an acrylic polymer prepared by vinyl addition polymerization of a monomer of acrylic acid, methacrylic acid or a mixture thereof, which provides an inexpensive reinforcement for polymeric matrices such as nylon.

BACKGROUND OF THE INVENTION

Reinforced composites are rapidly growing in popularity for such applications as automobile components, boat hulls and fishing rods. Reinforced polymeric composites can be formed from a polymeric matrix material, reinforcing material and any other desired components in a variety of ways. For example, for a thermosetting matrix material, a composite can be formed by molding, pultrusion, filament winding, hand lay-up or spray-up. For a thermoplastic matrix material, suitable methods for forming a composite include direct molding or extrusion compounding followed by injection molding.

As molding processes become more sophisticated and raw material costs escalate, the need for an inexpensive reinforcement which provides adequate physical properties in a composite, such as strength, modulus and impact resistance, has become increasingly important.

The coating on the reinforcement provides an interface between the reinforcement material, such as glass fiber strand, and the polymeric matrix material of the composite. The compatibility of the coating with the reinforcement material and the polymeric matrix material and strength of the bonding at the interface are important considerations in the selection of coating components. The amounts and types of components used in the coating composition influence the cost of the reinforcement. It is desirable to include less expensive components in the coating composition to lessen cost while maintaining performance of the reinforcement in the composite.

U.S. Pat. No. 4,762,750 discloses sized fiber bundles coated with an impregnating composition having one or more elastomeric polymers that are essentially free of hydrocarbon diene and chlorine functionalities and one or more crosslinking materials (see Abstract). The elastomeric polymer can be a polyurethane or an ethylene-containing interpolymer formed from ethylene monomer and one or more polar comonomers. See column 6, lines 21–38.

U.S. Pat. No. 5,182,784 discloses an aqueous coating composition for glass strands consisting essentially of 2–50 weight percent of a thermoplastic polyurethane latex, 3–55 weight percent of a first curable acrylic latex and 0.5–10 weight percent of a paraffin wax emulsion or a second curable acrylic latex. See column 1, lines 29–39.

In reinforcement of composites, including thermoplastics such as nylon, it is desirable to simplify and diversify the coating process and reduce the cost of coating composition components while providing coated reinforcements which have acceptable physical performance in the composite.

SUMMARY OF THE INVENTION

The present invention provides an aqueous coating composition adapted to coat a sized fiber strand, the aqueous coating composition comprising: (a) a urethane-containing polymer; and (b) a polymer prepared by addition polymerization of a monomer selected from the group consisting of acrylic acid, methacrylic acid and a mixture thereof, the aqueous coating composition being essentially free of acrylic latex, the aqueous coating composition being different from a sizing composition coating the sized fiber strand.

Another aspect of the present invention is an aqueous coating composition adapted to coat a sized fiber strand, the aqueous coating composition comprising: (a) a urethane-containing polymer; and (b) a polymer prepared by addition polymerization of (1) a monomer selected from the group consisting of acrylic acid, methacrylic acid and a mixture thereof; and (2) an addition polymerizable unsaturated carboxylic acid adapted to form a polymer, the aqueous coating composition being essentially free of acrylic latex, the aqueous coating composition being different from a sizing composition coating the sized fiber strand.

Another aspect of the present invention is a fiber strand adapted to reinforce a polymeric matrix material, at least a portion of a surface of the fiber strand having applied thereto a primary coating of a sizing composition and thereupon an aqueous secondary coating composition, the aqueous secondary coating composition comprising: (a) a urethane-containing polymer; and (b) a polymer prepared by addition polymerization of a monomer selected from the group consisting of acrylic acid, methacrylic acid and a mixture thereof, the aqueous coating composition being essentially free of acrylic latex, the aqueous coating composition being different from the sizing composition.

Yet another aspect of the present invention is a fiber strand adapted to reinforce a polymeric matrix material, at least a portion of a surface of the fiber strand having applied thereto a primary coating of a sizing composition and thereupon an aqueous secondary coating composition, the aqueous secondary coating composition comprising: (a) a urethane-containing polymer; and (b) a polymer prepared by addition polymerization of (1) a monomer selected from the group consisting of acrylic acid, methacrylic acid and a mixture thereof; and (2) an addition polymerizable unsaturated carboxylic acid adapted to form a polymer with the monomer, the aqueous coating composition being essentially free of acrylic latex, the aqueous coating composition being different from the sizing composition.

Another aspect of the present invention is a reinforced polymeric composite comprising: (a) a fiber strand reinforcing material, at least a portion of a surface of the fiber strand reinforcing material having applied thereto a primary coating of a sizing composition and thereupon an aqueous secondary coating composition, the aqueous secondary coating composition comprising: (1) a urethane-containing polymer; and (2) a polymer prepared by addition polymerization of a monomer selected from the group consisting of acrylic acid, methacrylic acid and a mixture thereof, the aqueous coating composition being essentially free of acrylic latex, the aqueous coating composition being different from the sizing composition; and (b) a polymeric matrix material.

BRIEF DESCRIPTION OF THE DRAWING

The foregoing summary, as well as the following detailed description of the preferred embodiments, will be better understood when read in conjunction with the appended drawing. In the drawing.

DETAILED DESCRIPTION OF THE INVENTION

Figure 1:
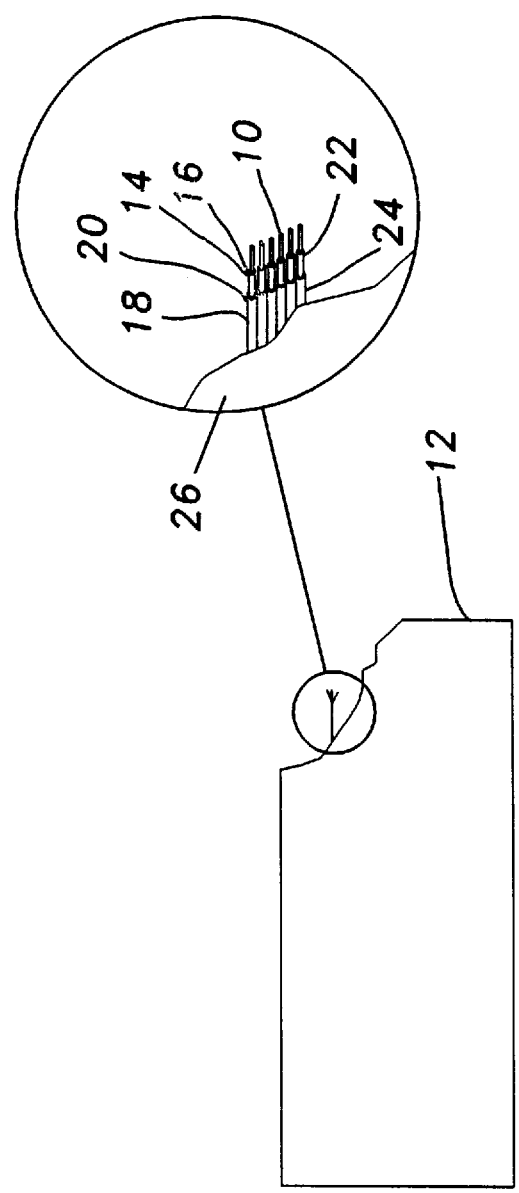
FIG. 1 is a top plan view of a portion of a composite according to the present invention, partially broken away to show coated glass fiber strands of the present invention.

The aqueous secondary coating composition of the present invention is adapted to coat a fiber strand or roving having thereon a sizing composition, which can be present as a dried residue. The fiber strands of the present invention, which are adapted to reinforce polymeric composites, provide composites having acceptable physical properties, such as tensile and flexural strength and impact resistance, and represent an inexpensive alternative to conventional glass fiber strand reinforcements coated with more costly components. As used herein, the term "strand" means a plurality of individual fibers. The term "fibers" means a plurality of individual filaments.

The fiber strand 10 of the present invention, shown in FIG. 1, has a sizing composition 14 on at least a portion of its surface 16 to protect the surface 16 from abrasion during processing. As used herein, the terms "size", "sized" or "sizing" refer to the composition applied to the fibers immediately after formation of the fibers. Suitable sizing compositions for use in the present invention will be discussed in detail below.

The term "secondary coating" 18 refers to a coating composition applied secondarily to the strands after the sizing composition is applied, which can be at least partially dried. The secondary coating is different from the sizing composition.

Broadly stated, the secondary coating composition is preferably aqueous-based and includes components which are water soluble, emulsifiable and/or dispersible. As used herein, the term "water soluble" means that the components are capable of being essentially uniformly blended and/or molecularly or ionically dispersed in water to form a true solution. See *Hawley's Condensed Chemical Dictionary*, (12th Ed. 1993) at page 1075, which is hereby incorporated by reference. The term "emulsifiable" as used herein means that the components are capable of forming an essentially stable mixture or being suspended in water in the presence of an emulsifying agent. See *Hawley's* at page 461, which is hereby incorporated by reference. Non-limiting examples of suitable emulsifying agents are set forth below. The term "dispersible" means that the components are capable of being distributed throughout water as finely divided particles, such as a latex. See *Hawley's* at page 435, which is hereby incorporated by reference. The uniformity of the dispersion can be increased by the addition of wetting, dispersing or emulsifying agents (surfactants), which are discussed below.

The aqueous secondary coating composition of the present invention comprises one or more urethane polymers as a film-forming material. The phrase "urethane-containing polymer" as used herein means any polymer containing one or more units of the structure (I):

See Kirk-Othmer, *Encyclopedia of Chemical Technology*, (1968) Vol. 21 at pages 56–69, which are hereby incorporated by reference. As noted in Kirk-Othmer, Vol. 21 at page 57, the terms urethane and polyurethane are commonly used to refer to urethan and polyurethan, respectively. As used herein, the terms "urethane" and "polyurethane" are used to refer to "urethan" and "polyurethan", respectively. Such urethane-containing polymers can be thermoplastic or thermosetting, and either water soluble, or emulsifiable or dispersible with the use of an emulsifying or dispersing agent.

Urethane-containing polymers are typically condensation products of a polyfunctional isocyanate-containing material and a hydroxyl-containing material. Polyfunctional isocyanate-containing materials useful in the present invention can be aromatic, aliphatic or cycloaliphatic and mixtures thereof.

Non-limiting examples of suitable aromatic polyisocyanates include difunctional isocyanates such as toluene diisocyanate, phenylene diisocyanate, dianisidine diisocyanate, diisocyanatodiphenyl methane, bis(p-phenyl isocyanate), bis(p-phenyl) methylene diisocyanate, bis(p-phenyl cyclohexyl) methylene diisocyanate and naphthalene diisocyanate. Useful aliphatic polyisocyanates include xylylene diisocyanate and tetramethylxylylene diisocyanate (such as TMXDI, which is commercially available from Cyanamid of Wayne, N.J.). Useful cycloaliphatic isocyanates include cyclohexane diisocyanate, hexamethylene diisocyanate, isophorone diisocyanate and dicyclohexylmethane-4,4'diisocyanate (which is commercially available as DESMODUR W from Miles, Inc. of Pittsburgh, Pa.). Isophorone diisocyanate is believed to be a preferred polyfunctional isocyanate containing material. An example of a suitable triisocyanate is DESMODUR N-3300 (which is commercially available from Bayer Corp. of Pittsburgh, Pa.).

Suitable hydroxyl-containing materials include polyether polyols and polyester polyols. See *Encyclopedia of Polymer Science and Technology*, (1969) Vol. 11 at pages 506–563, which is hereby incorporated by reference.

Examples of suitable polyether polyols include polyalkylene ether polyols such as poly(oxytetramethylene) glycols, poly(oxyethylene) glycols, poly(oxy-1,2-propylene) glycols and the reaction products of ethylene glycol with a mixture of 1,2-propylene oxide, ethylene oxide and alkyl glycidyl ethers; polyether polyols formed from oxyalkylation of various polyols such as ethylene glycol, 1,6-hexanediol, bisphenol A, trimethylolpropane, pentaerythritol, sorbitol or sucrose.

Examples of useful polyester polyols can be prepared by the polyesterification of an organic polycarboxylic acid or anhydride thereof with organic polyols and/or an epoxide. Suitable polycarboxylic acids include dicarboxylic acids such as phthalic acid, isophthalic acid, terephthalic acid, tetrahydrophthalic acid, hexahydrophthalic acid, adipic acid, azelaic acid, sebacic acid, maleic acid, glutaric acid, decanoic acid, dodecanoic acid and tricarboxylic acids such as trimellitic acid and tricarballylic acid.

Suitable polyols for forming the polyester polyols include diols such as alkylene glycols, for example ethylene glycol, propylene glycol, butylene glycol, neopentyl glycol, hydrogenated bisphenol A, cyclohexanediol, cyclohexanedimethanol, hydroxy-alkylated bisphenols and polyether glycols. Other useful polyols include trimethylolpropane, trimethylolethane and pentaerythritol.

Non-limiting examples of useful thermoplastic urethane polymers include WITCOBOND® W-290H, WITCOBOND® W-212 and WITCOBOND® W-234 polyurethanes which are commercially available from Witco Chemical Corp. of Chicago, Ill.; RUCOTHANE® 2011L polyurethane, which is commercially available from Ruco Polymer Corp. of Hicksville, N.Y.; BAYBOND® 400S polyurethane which is commercially available from Bayer Corp. of Pittsburgh, Pa. and NEOXIL® polyurethanes such as NEOXIL® 9851, commercially available from DSM Italia, which is the preferred urethane polymer for use in the present invention.

An example of a suitable thermosetting polyurethane is BAYBOND XW-110, which is commercially available from Bayer Corp. of Pittsburgh, Pa.

The amount of the urethane polymer can be about 1 to about 60 weight percent of the aqueous secondary coating composition on a total solids basis, preferably about 10 to about 50 weight percent, and more preferably about 20 to about 40 weight percent.

The aqueous secondary coating composition of the present invention also comprises one or more polymers prepared by addition polymerization of a monomer selected from the group consisting of acrylic acid, methacrylic acid and a mixture thereof (hereinafter referred to as "acrylic polymer"). No acrylate monomers are used as reactants in the addition polymerization of the acrylic polymer.

Preferably, the acrylic polymer has at least one acid functional carboxyl group. As used herein, the phrase "acid functional" means that the acrylic polymer is a substance that can give up a proton to a base in a chemical reaction; a substance that is capable of reacting with a base to form a salt; or a compound that produces hydronium ions, $H_3O^+$, in aqueous solution. See Hawley's at page 15 and K. Whitten et al., General Chemistry, (1981) at page 192, which are hereby incorporated by reference.

The acrylic polymer is preferably neutralized with a base such as sodium hydroxide or preferably ammonium hydroxide. As used herein, the term "neutralize" means that the acrylic polymer and base have been reacted to attain the equivalence point. See Hawley's at page 815, which is hereby incorporated by reference. The equivalent weight of a base is the weight that will react with an equivalent weight of acid. The equivalent weight of the base depends upon the selected acrylic polymer to be neutralized. Such neutralization amounts and methods are well known to those skilled in the art and further discussion thereof is not believed to be necessary. A preferred acrylic polymer for use in the present invention is DISPEX™ A-40 polyacrylic acid which is neutralized with ammonium hydroxide, which is commercially available from Allied Colloids of Sussolk, Va. Other examples of polyacrylic acids useful in the present invention are VERSICOL™ E7, VERSICOL™ E9 and VERSICOL™ E11, which are commercially available from Allied Colloids.

In an alternative embodiment, the acrylic polymer is prepared by addition polymerization of (1) a monomer selected from the group consisting of acrylic acid, methacrylic acid and a mixture thereof, as discussed above; and (2) an addition polymerizable unsaturated carboxylic acid adapted to form a polymer with the monomer.

One skilled in the art would understand the criteria for selecting a suitable addition polymerizable unsaturated carboxylic acid which is capable of forming a polymer with the monomer. Such criteria can include, for example, structural characteristics and reactivity rate which are appropriate to form a polymer from the addition polymerizable unsaturated carboxylic acid and the monomer. Guidance in selecting appropriate addition polymerizable unsaturated carboxylic acids can be found in Kirk-Othmer, Vol. 1 at pages 224–254.

Methods for polymerizing acrylic monomers with themselves and other monomers are well known to those skilled in the art of polymers and further discussion thereof is not believed to be necessary in view of the present disclosure. For example, polymerization of the acrylic monomer can be carried out in aqueous or organic solvent solution such as benzene or by exposure to ultraviolet light. Kirk-Othmer, Vol. 1 at pages 203–204, which are hereby incorporated by reference. The polymerization can be effected by means of a suitable initiator system, including free radical initiators such as benzoyl peroxide or azobisisobutyronitrile, or by the action of light. Molecular weight can be controlled by choice of solvent or polymerization medium, concentration of initiator or monomer and temperature.

The acrylic polymer is present in a "true solution", meaning it is a uniformly dispersed mixture at the molecular or ionic level in the solvent solution. See Hawley's at page 1075, which is hereby incorporated by reference. The acrylic polymer is not present as colloidal particles in solution, such as a latex.

The number average molecular weight (Mn), as determined by gel permeation chromatography, of the acrylic polymer can be about 200 to about 6,000,000 and is preferably about 8,000 to about 500,000. The glass transition temperature of the acrylic polymer can be about −40° C. to about 100° C., preferably about −30° C. to about 80° C., and more preferably about −25 to about +45 as measured using a Differential Scanning Calorimeter (DSC), for example a Perkin Elmer Series 7 Differential Scanning Calorimeter, using a temperature range of about −55° C. to about 150° C. and a scanning rate of about 20° C. per minute.

The amount of the acrylic polymer can be about 40 to about 95 weight percent of the aqueous secondary coating composition on a total solids basis, preferably about 50 to about 80 weight percent, and more preferably about 60 to about 70 weight percent.

The aqueous coating composition is essentially free of acrylic latex, and preferably free of acrylic latex. As used herein, the phrase "acrylic latex" means a colloidal solution or suspension of one or more particulate acrylic polymers or acrylates. See Hawley's at page 683. The phrase "essentially free of acrylic latex" as used herein means that the aqueous secondary coating composition contains less than 3 weight percent of acrylic latex on a total solids basis, preferably less than about 2 weight percent, and most preferably the aqueous secondary coating composition is free of acrylic latex.

Such acrylic latexes include (1) polymers of acrylate monomers, such as methyl methacrylate, methyl acrylate, ethyl methacrylate, 2-ethylhexyl acrylate and butyl acrylate; and (2) polymers of mixtures of acrylate monomers with other addition polymerizable monomers such as dimethyl acrylamide N-vinyl pyrrolidone, isobornyl acrylate, acrylic acid, dicyclopentenyl acrylate, 2-hydroxyethyl acrylate and 2-hydroxypropyl acrylate.

Non-limiting example of acrylic latexes include RHOPLEX® E-32 nonionic self-crosslinking acrylic emulsion, RHOPLEX® WL-81 acrylic latex and RHOPLEX® E-693 emulsion, which are commercially available from Rohm & Haas Company.

Another example of an acrylic latex is an acrylonitrile butadiene copolymer such as is commercially available from B. F. Goodrich Chemical Co. under the trade designation of HYCAR G-17.

The aqueous secondary coating composition of the present invention can further comprise one or more fiber lubricants which are different from the polyamide. Useful fiber lubricants include cationic, non-ionic or anionic lubricants and mixtures thereof. Generally, the amount of fiber lubricant can be about 0.5 to about 15 weight percent of the aqueous secondary coating composition on a total solids basis, preferably about 1 to about 12 weight percent, and more preferably about 2 to about 8 weight percent.

Non-limiting examples of such fiber lubricants include amine salts of fatty acids (which can, for example, include a fatty acid moiety having 12 to 22 carbon atoms and/or tertiary amines having alkyl groups of 1 to 22 atoms attached to the nitrogen atom), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), condensates of a fatty acid and polyethylene imine and amide substituted polyethylene imines, such as EMERY® 6717, a partially amidated polyethylene imine commercially available from Henkel Corporation of Kankakee, Ill.

A useful alkyl imidazoline derivative is CATION X, which is commercially available from Rhone Poulenc of Princeton, N.J. Other useful lubricants include RD-1135B epoxidized polyester which is commercially available from Borden Chemical of Louisville, Ky., CIRRASOL 185A fatty acid amide, KETJENLUBE 522 partially carboxylated polyester which is commercially available from Akzo Chemicals, Inc. Of Chicago, Ill. and PROTOLUBE HD high density polyethylene emulsion which is commercially available from Sybron Chemicals of Birmingham, N.J.

The aqueous secondary coating composition can further comprise one or more coupling agents selected from the group consisting of organo silane coupling agents, transition metal coupling agents, amino-containing Werner coupling agents and mixtures thereof. These coupling agents typically have dual functionality. Each metal or silicon atom has attached to it one or more groups which can react or compatibilize with the fiber surface and/or the components of the aqueous secondary coating composition. As used herein, the term "compatibilize" means that the groups are chemically attracted, but not bonded, to the fiber surface and/or the components of the sizing composition, for example by polar, wetting or solvation forces. Examples of hydrolyzable groups include:

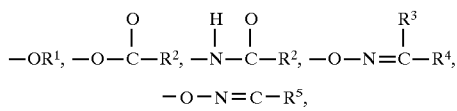

and the monohydroxy and/or cyclic $C_2$–$C_3$ residue of a 1,2- or 1,3 glycol, wherein $R^1$ is $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene. Examples of suitable compatibilizing or functional groups include epoxy, glycidoxy, mercapto, cyano, allyl, alkyl, urethano, halo, isocyanato, ureido, imidazolinyl, vinyl, acrylato, methacrylato, amino or polyamino groups.

Functional organo silane coupling agents are preferred for use in the present invention. Examples of suitable functional organo silane coupling agents include 3-aminopropyldimethylethoxysilane, gamma-aminopropyltriethoxysilane, gamma-aminopropyltrimethoxysilane, beta-aminoethyltriethoxysilane, N-beta-aminoethyl-aminopropyltrimethoxysilane, gamma-isocyanatopropyltriethoxysilane, vinyl-trimethoxysilane, vinyl-triethoxysilane, allyl-trimethoxysilane, mercaptopropyltrimethoxysilane, mercaptopropyltriethoxysilane, glycidoxypropyltriethoxysilane, glycidoxypropyltrimethoxysilane, 4,5-epoxycyclohexyl-ethyltrimethoxysilane, ureidopropyltrimethoxysilane, ureidopropyltriethoxysilane, chloropropyltrimethoxysilane, and chloropropyltriethoxysilane.

Non-limiting examples of useful functional organo silane coupling agents include epoxy (A-187 gamma-glycidoxypropyltrimethoxysilane), methacrylate (A-174 gamma-methacryloxypropyltrimethoxysilane) and amino (A-1100 gamma-aminopropyltriethoxysilane) silane coupling agents (preferred), each of which are commercially available from OSi Specialties, Inc. of Tarrytown, N.Y. The organo silane coupling agent can be at least partially hydrolyzed with water prior to application to the glass fibers, preferably at about a 1:1 stoichiometric ratio or, if desired, applied in unhydrolyzed form.

Suitable transition metal coupling agents include titanium, zirconium and chromium coupling agents. Non-limiting examples of suitable titanate coupling agents include titanate complexes such as KEN-REACT KR-44, KR-34 and KR-38; suitable zirconate coupling agents include KEN-REACT NZ-97 and LZ-38, all of which are commercially available from Kenrich Petrochemical Company. Suitable chromium complexes include VOLAN which is commercially available from E. I. duPont de Nemours of Wilmington, Del. The amino-containing Werner-type coupling agents are complex compounds in which a trivalent nuclear atom such as chromium is coordinated with an organic acid having amino functionality. Other metal chelate and coordinate type coupling agents known to those skilled in the art can be used herein.

The amount of coupling agent can be 1 to about 25 weight percent of the aqueous secondary coating composition on a total solids basis, and is preferably about 4 to about 12 weight percent.

The aqueous secondary coating composition can further comprise one or more film-forming materials different from the components discussed above, such as thermoplastic materials, thermosetting materials and mixtures thereof.

Examples of the thermoplastic and thermosetting film-forming materials include aminoplasts, alkyds, epoxides, phenolics, polyamides, polyolefins, polyesters, vinyl polymers, derivatives and mixtures thereof, to name a few.

Useful aminoplasts include urea-formaldehyde and melamine formaldehyde such as RESIMENE 841 which is commercially available from Monsanto Co. of St. Louis, Mo. A non-limiting example of a phenolic suitable for use in the present invention is phenol formaldehyde.

Useful epoxides include any material containing at least one epoxy or oxirane group in the molecule, such as polyglycidyl ethers of polyhydric alcohols or thiols. Polyglycidyl ethers of polyhydric alcohols can be formed by reacting epihalohydrins and/or butadiene dioxide with polyhydric alcohols, such as dihydric alcohols, in the presence of an alkali condensation and dehydrohalogenation catalyst such as sodium hydroxide or potassium hydroxide.

Non-limiting examples of aromatic polyhydric alcohols include phenols; dihydroxybenzenes, for example resorcinol, pyrocatechol and hydroquinone; bis(4-hydroxyphenyl)-1,1-isobutane; 4,4'-dihydroxybenzophenone; bis(4-hydroxyphenyl)-1,1-ethane; bis(2-hydroxyphenyl)methane; 1,5-hydroxynaphthalene; 4-isopropylidene bis(2,6-dibromophenol); 1,1,2,2-tetra(p-hydroxy phenyl)-ethane; 1,1,3-tris(p-hydroxy phenyl)-propane; novolac resins; bisphenol F; long-chain bisphenols; and 4,4'-isopropylidenediphenol, i.e., bisphenol A.

Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2, 6-hexanetriol, erythritol and trimethylolpropane; and mixtures thereof.

Examples of commercially available epoxy materials are EPON® 826 and 828 epoxy resins, which are epoxy functional polyglycidyl ethers of bisphenol A prepared from bisphenol-A and epichlorohydrin and are commercially available from Shell Chemical.

The secondary coating composition can include one or more polyamides, for example which are the reaction product of (1) one or more polycarboxylic acids containing two or more carboxyl (—COOH) groups and (2) one or more polyoxyalkylene amines. The polycarboxylic acid and polyoxyalkylene amine are preferably reacted at a 1:1 molar ratio, although this ratio can vary. Suitable polyamides can have a melting point of about 80° C. to about 250° C., and preferably about 100° C. to about 190° C.

Examples of suitable dicarboxylic acids include oxalic acid, malonic acid, succinic acid, glutaric acid, adipic acid, pimelic acid, suberic acid, azelaic acid, sebacic acid, dodecanedioic acid and dimer acids.

Non-limiting examples of polyoxyalkylene amines suitable for use in forming the polyamide include the JEFFAMINE® products which are commercially available from Huntsman Corporation of Austin, Tex., such as JEFFAMINE® EDR-148, which is a triethylene glycol diamine; JEFFAMINE® EDR-192, which is a tetraethylene glycol diamine; JEFFAMINE® ED-600, ED-900, ED-2001, ED-6000, D-230, D-400 and D-2000.

Non-limiting examples of useful polyolefins include polypropylene and polyethylene materials such as the polypropylene emulsion RL-5440, which is commercially available from Sybron Chemicals of Birmingham, N.J., and POLYEMULSION CHEMCOR 43C30, which is commercially available from Chemical Corp. of America. Another example of a suitable polyolefin for use in the present invention is the high density polyethylene emulsion Protolube HD which is commercially available from Sybron Chemicals of Birmingham, N.J.

Non-limiting examples of useful polyester materials include RD-847A polyester resin which is commercially available from Borden Chemicals of Columbus, Ohio. Other suitable polyesters are STYPOL polyesters which are commercially available from Cook Composites and Polymers of Port Washington, Wis. and Neoxil polyesters which are commercially available from Savid S.p.A. of Como, Italy.

Thermoplastic polyesters useful in the present invention include ethylene adipates (such as DESMOPHEN 2000) and ethylene butylene adipates (such as DESMOPHEN 2001KS), both of which are commercially available from Bayer of Pittsburgh, Pa.

Non-limiting examples of useful vinyl polymers include RESYN 2828 and RESYN 1037 vinyl acetate copolymer emulsions which are commercially available from National Starch, and other polyvinyl acetates such as are commercially available from H. B. Fuller and Air Products and Chemicals Co. of Allentown, Pa. Other useful vinyl polymers include polyvinyl pyrrolidones such as PVP K-15, PVP K-30, PVP K-60 and PVP K-90, each of which are commercially available from ISP Chemicals of Wayne, N.J.

The amount of film-forming material can be about 1 to about 20 weight percent of the aqueous secondary coating composition on a total solids basis, and preferably about 1 to about 5 weight percent.

Crosslinking materials, such as the aminoplasts discussed above, can also be included in the sizing composition. Non-limiting examples of suitable crosslinkers include melamine formaldehyde, blocked isocyanates such as BAYBOND XW 116 or XP 7055, epoxy crosslinkers such as WITCOBOND XW by Witco Corp., and polyesters such as Baybond XP-7044 or 7056. The Baybond products are commercially available from Bayer of Pittsburgh, Pa. The amount of crosslinker can be about 1 to about 25 weight percent of the sizing composition on a total solids basis.

The aqueous secondary coating composition can include one or more emulsifying agents for emulsifying components of the secondary coating composition, such as the acrylic polymer. Non-limiting examples of suitable emulsifying agents or surfactants include polyoxyalkylene block copolymers, ethoxylated alkyl phenols, polyoxyethylene octylphenyl glycol ethers, ethylene oxide derivatives of sorbitol esters and polyoxyethylated vegetable oils.

Examples of suitable polyoxypropylene-polyoxyethylene copolymers are SYNPERONIC F-108 and PLURONIC™ F-108, which is commercially available from BASF Corporation of Parsippany, N.J.

Examples of useful ethoxylated alkyl phenols include ethoxylated octylphenoxyethanol, phenoxy polyethyleneoxy(ethanol), phenoxy(ethyleneoxy)ethanol and nonyl phenoxy poly(ethyleneoxy)ethanol. An example of a commercially available ethoxylated octylphenoxyethanols are IGEPAL CA-630 from GAF Corporation of Wayne, N.J.

An example of a polyoxyethylated vegetable oil is EMULPHOR EL-719, which is commercially available from GAF Corp. A useful polyoxyethylene octylphenyl glycol ether is TRITON X-100, which is commercially available from Rohm & Haas of Philadelphia, Pa. TWEEN 21 and 81 are examples of useful ethylene oxide derivatives of sorbitol esters.

Other examples of suitable emulsifying agents include non-ionic epoxide polyols such as NOVEPOX™ or PROX E 117, which are commercially available from Synthron, Inc.

Generally, the amount of emulsifying agent can be about 0.01 to about 20 weight percent of the aqueous secondary coating composition on a total solids basis, and is more preferably about 0.1 to about 10 weight percent.

Fungicides, bactericides and anti-foaming materials can also be included in the aqueous secondary coating composition. A wide variety of materials are suitable for this purpose. Examples of suitable bactericides include potassium cyanide and BIOMET 66 antimicrobial compound, which is commercially available from M & T Chemicals of Rahway, N.J. Suitable anti-foaming materials are the SAG materials which are commercially available from OSi Specialties, Inc. of Danbury, Conn. The amount of fungicide or bactericide can be about $1 \times 10^{-4}$ to about 5 weight percent of the aqueous secondary coating composition on a total solids basis.

The secondary coating composition can further comprise one or more organic and/or inorganic acids or bases in an amount sufficient to provide the aqueous sizing composition with a pH of about 4 to about 11, preferably about 6 to about 9. Non-limiting examples of organic acids suitable for use in the present invention include mono- and polycarboxylic acids and/or anhydrides thereof, such as acetic, citric, formic, propionic, caproic, lactic, benzoic, pyruvic, oxalic, maleic, fumaric, acrylic, methacrylic acids and mixtures thereof. A non-limiting example of a suitable inorganic acid is hydrochloric acid. Non-limiting examples of suitable bases include alkali metal hydroxides, alkali metal carbonates and ammonium hydroxide.

The aqueous secondary coating composition can include one or more aqueous soluble, emulsifiable or dispersible wax materials to increase lubricity. The wax material can be selected from vegetable, animal, mineral, synthetic or petroleum waxes, for example. Suitable commercially available petroleum waxes are, for example, MICHEM® LUBE 296 microcrystalline wax, POLYMEKON® SPP-W microcrystalline wax and PETROLITE 75 microcrystalline wax which are available from Michelman Inc. of Cincinnati, Ohio and the Petrolite Corporation of Tulsa, Okla., respectively. Generally, the amount of wax can be about 1 to about 10 weight percent of the aqueous secondary coating composition on a total solids basis, and preferably about 3 to about 5 weight percent.

The aqueous secondary coating composition can also include one or more aqueous dispersible or soluble plasticizers to improve flexibility. Examples of suitable non-aqueous-based plasticizers which are aqueous dispersible plasticizers include phthalates, such as di-n-butyl phthalate; trimellitates, such as trioctyl trimellitate; and adipates, such as dioctyl adipate. An example of an aqueous soluble plasticizer is CARBOWAX 400, a polyethylene glycol which is commercially available from Union Carbide of Danbury, Conn. The amount of plasticizer can be about 5 to about 15 weight percent of the coating composition on a total solids basis, and is more preferably about 5 to about 10 weight percent.

Optical brighteners (fluorescent whitening agent or brightening agent) which typically absorb the invisible ultraviolet portion of the daylight spectrum between about 300 and 400 nanometers and converts this energy into longer wavelength visible portion of the spectrum between about 400 and 500 nanometers can be included in the aqueous secondary coating composition. Non-limiting examples of suitable optical brighteners include bisbenzoxazoles such as EASTOBRITE® OB-1 and EASTOBRITE® OB-3, which are commercially available from Eastman Chemical Co. of Kingsport, Tenn. These materials are commercially available in aqueous emulsions as AQUASTAB® products which are commercially available from Eastman Chemical Co. Other useful optical brighteners include UVITEX® products which are commercially available from Ciba-Geigy Corp. of Greensboro, N.C. The amount of optical brightener can be about 0.05 to about 5 weight percent of the total solids of the aqueous secondary coating composition.

The aqueous secondary coating composition can include antioxidants, such as propionates, sulfur-containing materials, phosphorus-containing materials, hindered phenols, diaryl amines and thioethers. The amount of antioxidant can be about 1 to about 25 weight percent of the total solids of the aqueous secondary coating composition.

Examples of useful propionates include IRGANOX™ 1010 and Irganox™ 1076, which are commercially available from Ciba-Geigy Corp. of Greensboro, N.C.

Examples of useful sulfur-containing materials include Anoxsyn 442, which is a bis alkyl sulfide commercially available from Atochem N.A. of Philadelphia, Pa., and distearylthiodipropionate (DSTDP).

Non-limiting examples of phosphorus-containing antioxidant materials include phosphites such as sodium hypophosphite, IRGANOX™ B215 and IRGANOX™ 168, which are commercially available from Ciba-Geigy Corp., and ULTRANOX 626 which is commercially available from GE Specialty Chemicals.

Examples of ultraviolet light stabilizers useful in the present invention include hindered-amine light stabilizers (HALS) such as are available from Atochem. The amount of ultraviolet light stabilizer can be about $1 \times 10^{-4}$ to about 10 weight percent of the total solids of the aqueous secondary coating composition.

Useful colorants or pigments include Ultramarine Blue which is commercially available from Whittaker Chemical. The amount of colorant can be about $1 \times 10^{-4}$ to about 10 weight percent of the total solids of the aqueous secondary coating composition.

Examples of antistatic agents useful in the present invention include LAROSTAT 264 alkyl dipolyoxyethylene ethyl ammonium ethyl sulfate which is commercially available from PPG Industries, Inc. of Pittsburgh, Pa. The amount of antistatic agent can be about $1 \times 10^{-4}$ to about 10 weight percent of the aqueous secondary coating composition on a total solids basis.

The aqueous secondary coating composition can also include nucleating agents such as sodium benzoate and impact modifiers or elastomers such as natural or synthetic rubbers. The amounts of these other additives can be about 0.01 to about 25 weight percent of the aqueous secondary coating composition.

Water (preferably deionized) is included in the aqueous secondary coating composition in an amount sufficient to facilitate application of a generally uniform coating upon the strand. The weight percentage of solids of the aqueous secondary coating composition generally can be about 1 to about 80 weight percent. Preferably, the weight percentage of solids is about 1 to about 25 weight percent and, more preferably, about 2 to about 15 weight percent. Although not preferred, it should be understood that minor amounts of water miscible or water soluble organic solvents can be included in the aqueous secondary coating composition, so long as the essential characteristics of the aqueous secondary coating composition are not adversely affected.

The aqueous secondary coating composition of the present invention can be prepared by any suitable method such as conventional mixing well known to those skilled in the art. The acrylic polymer, fiber lubricant and polyamide are preferably diluted or dissolved in deionized water before mixing with the other components. The coupling agent is preferably at least partially hydrolyzed prior to mixing with the other components of the secondary coating composition.

The aqueous secondary coating composition is applied to at least a portion 20 of the surface 16 of a fiber strand 10, shown in FIG. 1. The fiber strand 10 has a primary coating of an essentially dried residue 22 of a sizing composition 14 on at least a portion of the surface 16 to protect the surface 16 from abrasion during processing.

Typical sizing compositions are aqueous-based and can include as components film-formers, lubricants, coupling agents, waxes, emulsifiers and water, to name a few. Non-limiting examples of suitable sizing compositions are disclosed in Loewenstein (3d Ed.) at pages 237–289.

The preferred sizing composition preferably comprises one or more fiber lubricants such as are discussed in detail above. The preferred fiber lubricant for the sizing composition is EMERY® 6760, which is a partially amidated polyethylene imine commercially available from Henkel Corporation of Kankakee, Ill. Generally, the amount of fiber lubricant can be about 5 to about 90 weight percent of the sizing composition on a total solids basis, preferably about 5 to about 30 weight percent, and more preferably about 5 to about 15 weight percent.

The sizing composition preferably comprises one or more coupling agents such as are discussed in detail above. The preferred fiber coupling agent for the sizing composition is an amino silane coupling agent such as A-1100 gamma-aminopropyltriethoxysilane, which is commercially available from OSi Specialties, Inc. of Tarrytown, N.Y. Generally, the amount of coupling agent can be 10 to about 95 weight percent of the sizing composition on a total solids basis, and is preferably about 50 to about 90 weight percent.

The sizing composition can also include other components such as film-formers, crosslinkers, emulsifiers and waxes discussed above, but has at least one component different from the secondary coating. The amounts of such components used in the sizing composition are similar to the amounts set forth above for the secondary coating composition and such determination is within the skill of a skilled artisan.

The sizing composition is applied to at least a portion of the surface of the fibers of the strand. The present invention is generally useful for coating fibers, strands, yarns or the like of natural or man-made materials. Fibers believed to be useful in the present invention are discussed at length in the *Encyclopedia of Polymer Science and Technology*, Vol. 6 (1967) at pages 505–712, which is hereby incorporated by reference.

Suitable natural materials include those derived directly from animal, vegetable and mineral sources. *Encyclopedia of Polymer Science and Technology*, Vol. 6 at 505–506; 522–542; 691–712. Examples of methods for preparing and processing such natural fibers are also discussed in the *Encyclopedia of Polymer Science and Technology*, Vol. 6 at 709–712. Further discussion thereof is not believed to be necessary in view of the above and the present disclosure.

Suitable natural inorganic fibers are discussed in the *Encyclopedia of Polymer Science and Technology*, Vol. 6 at 610–690 and include glass and polycrystalline fibers, such as ceramics including silicon carbide, and carbon or graphite. Examples of suitable minerals include mineral wool and basalt.

The preferred fibers for use in the present invention are glass fibers, a class of fibers generally accepted to be based upon oxide compositions such as silicates selectively modified with other oxide and non-oxide compositions. Useful glass fibers can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives that are fluorine-free and/or boron-free. Such compositions and methods of making glass filaments therefrom are well known to those skilled in the art and further discussion thereof is not believed to be necessary in view of the present disclosure. If additional information is needed, such glass compositions and fiberization methods are disclosed in K. Loewenstein, "The Manufacturing Technology of Glass Fibres", (2d Ed. 1983) at pages 29, 33–45, 47–60, 118–120 and 122–125, which is hereby incorporated by reference.

Non-limiting examples of suitable animal and vegetable-derived natural materials include cotton, cellulose, natural rubber, flax, ramie, hemp, sisal and wool.

Suitable man-made fibers can be formed from a fibrous or fiberizable material prepared from natural organic polymers, synthetic organic polymers or inorganic substances. *Encyclopedia of Polymer Science and Technology*, Vol. 6 at 506–507. As used herein, the term "fiberizable" means a material capable of being formed into a generally continuous filament, fiber, strand or yarn.

Man-made fibers produced from natural organic polymers are regenerated or derivative. *Encyclopedia of Polymer Science and Technology*, Vol. 6 at 506. A regenerated fiber is formed when a natural polymer or its chemical derivative is dissolved and extruded as a continuous filament which retains, or after fiber forming has regenerated, the chemical nature of the natural polymer. *Encyclopedia of Polymer Science and Technology*, Vol. 6 at 506. An example of a regenerated fiber is a regenerated cellulosic fiber. *Encyclopedia of Polymer Science and Technology*, Vol. 6 at 542–548. A derivative fiber is formed when a chemical derivative of the natural fiber is prepared, dissolved and extruded as a continuous filament which retains the chemical nature of the derivative. *Encyclopedia of Polymer Science and Technology*, Vol. 6 at 506.

Man-made fibers can also be based upon synthetic polymers such as polyamides, polyesters, acrylics, polyolefins, polyurethanes, vinyl polymers, derivatives and mixtures thereof. *Encyclopedia of Polymer Science and Technology*, Vol. 6 at 506.

Suitable man-made fibers can be formed by a variety of polymer extrusion and fiber formation methods, such as for example drawing, melt spinning, dry spinning, wet spinning and gap spinning. Such methods are well known to those skilled in the art and further discussion thereof is not believed to be necessary in view of the present disclosure. If additional information is needed, such methods are disclosed in *Encyclopedia of Polymer Science and Technology*, Vol. 6 at 507–508.

Non-limiting examples of useful polyamide fibers include nylon fibers such as nylon 6 (a polymer of caprolactam), nylon 6,6 (a condensation product of adipic acid and hexamethylenediamine), nylon 12 (which can be made from butadiene) and nylon 10. Many of these nylons are commercially available from E. I. duPont de Nemours and Company of Wilmington, Del. and BASF Corp. of Parsippany, N.J. Other useful polyamides include polyhexamethylene adipamide, polyamide-imides and aramids such as KEVLAR™, which is commercially available from duPont.

Thermoplastic polyester fibers useful in the present invention include those composed of at least 85% by weight of an ester of a dihydric alcohol and terephthalic acid, such as polyethylene terephthalate (for example DACRON™ which is commercially available from duPont and FORTREL™ which is commercially available from Hoechst Celanese Corp. of Summit, N.J.) and polybutylene terephthalate.

Fibers formed from acrylic polymers believed to be useful in the present invention include polyacrylonitriles having at least about 35% by weight acrylonitrile units, and preferably at least about 85% by weight, which can be copolymerized with other vinyl monomers such as vinyl acetate, vinyl chloride, styrene, vinylpyridine, acrylic esters or acrylamide. See *Encyclopedia of Polymer Science and Technology*, Vol. 6 at 559–561. A non-limiting example of a suitable acrylic polymer fiber is ORLON™, a copolymer which contains at least 85% acrylonitrile which is commercially available from duPont.

Useful polyolefin fibers are generally composed of at least 85% by weight of ethylene, propylene, or other olefins. See *Encyclopedia of Polymer Science and Technology*, Vol. 6 at 561–564.

Fibers formed from vinyl polymers believed to be useful in the present invention can be formed from polyvinyl chloride, polyvinylidene chloride (such as SARAN™, which is commercially available from Dow Plastics of Midland, Mich.), polytetrafluoroethylene, and polyvinyl alcohol (such as VINYLON™, a polyvinyl alcohol fiber which has been crosslinked with formaldehyde).

Further examples of thermoplastic fiberizable materials believed to be useful in the present invention are fiberizable polyimides, polyether sulfones, polyphenyl sulfones; polyetherketones, polyphenylene oxides, polyphenylene sulfides and polyacetals.

Suitable elastomeric fibers are synthetic rubbers or spandex polyurethanes in which the fiber-forming substance is a long-chain synthetic polymer comprised of at least 85% by weight of a segmented polyurethane having alternating soft and hard regions in the polymer structure. See *Encyclopedia of Polymer Science and Technology*, Vol. 6 at 564–566 and 573–591. As used herein, the term "elastomeric fiber" means a fiber that will recover from long-range deformations immediately upon removal of the deforming force. *Encyclopedia of Polymer Science and Technology*, Vol. 6 at 564. A commercial spandex fiber is LYCRA™, which is available from duPont.

It is understood that blends or copolymers of any of the above materials and combinations of fibers formed from any of the above materials can be used in the present invention, if desired.

The present invention will now be discussed generally in the context of glass fiber strands. However, one of ordinary skill in the art would understand that the aqueous secondary coating composition of the present invention is useful for coating any of the fibers discussed above.

The sizing can be applied in many ways, for example by contacting the filaments with a static or dynamic applicator, such as a roller or belt applicator, spraying or other means. See *Loewenstein* (3d Ed.) at pages 165–172, which is hereby incorporated by reference.

The sized fibers can be dried prior to any subsequent processing steps or the sized fibers can be chopped while wet and subsequently dried. The sized fibers are preferably dried at room temperature or at elevated temperatures. Drying of glass fiber forming packages or cakes is discussed in detail in *Loewenstein* (3d Ed.) at pages 219–222, which are hereby incorporated by reference. For example, the forming package can be dried in an oven at a temperature of about 104° C. (220° F.) to about 160° C. (320° F.) for about 10 to about 24 hours to produce glass fiber strands having a dried residue of the composition thereon. The temperature and time for drying the glass fibers will depend upon such variables as the percentage of solids in the sizing composition, components of the sizing composition and type of glass fiber. The sizing composition is typically present on the fibers in an amount between about 0.1 percent and about 5 percent by weight after drying.

Suitable ovens or dryers for drying glass fibers are well known to those skilled in the art. The dryer removes excess moisture from the fibers and, if present, cures any curable sizing or secondary coating composition components.

The secondary coating composition is applied to at least a portion of the surface of the strands in an amount effective to coat or impregnate the portion of the strands. The secondary coating composition can be conventionally applied by dipping the strand in a bath containing the composition, by spraying the composition upon the strand or by contacting the strand with a static or dynamic applicator such as a roller or belt applicator, for example. The coated strand can be passed through a die to remove excess coating composition from the strand and/or dried as discussed above for a time sufficient to at least partially dry or cure the secondary coating composition. The method and apparatus for applying the secondary coating composition to the strand is determined in part by the configuration of the strand material.

Preferably, the secondary coating composition is applied to the strands by passing the strands over a rotating applicator roll which is at least partially immersed in the secondary coating composition and exposing the fibers to elevated temperatures for a time sufficient to at least partially dry or cure the secondary coating composition. The strand can be "opened up" just before entering the secondary coating composition bath by passing it over a bar or other spreading device which acts to separate the individual fibers from one another. This spreading of the fibers from one another results in a more thorough impregnation of the strand with the composition.

The strand is preferably dried after application of the secondary coating composition to form an at least partially dried residue 24 of the secondary coating in a manner well known in the art. For example, the coated strand is at least partially dried in air at room temperature (about 25° C.) or alternatively in a furnace or oven, preferably above 232° C. (450° F.), to speed the curing process and evaporate the water. A particularly suitable dryer is that disclosed in U.S. Pat. No. 5,197,202, which is hereby incorporated by reference.

The fiber strands can be used in a wide variety of applications, but are preferably used as reinforcements for reinforcing polymeric matrix materials, such as polymeric thermoplastic materials and polymeric thermosetting materials.

Non-limiting examples of suitable polymeric thermoplastic materials include polyolefins, polyamides, thermoplastic polyurethanes, thermoplastic polyesters, vinyl polymers, derivatives and mixtures thereof.

Non-limiting examples of useful polyolefins include polyethylene, extended-chain polyethylene, polypropylene, polybutene, polyisoprene, and polypentene, polymethyl pentene, polytetrafluoroethylene, neoprene and polyketones such as CARILON® which is commercially available from Shell Chemical Co.

Useful polyamides include nylons such as nylon 6 (a polymer of caprolactam), nylon 12 (which can be made from butadiene), nylon 66 (a condensation product of adipic acid and hexamethylenediamine), nylon 10 and nylon 12. Useful nylons are commercially available from DuPont. Other examples of useful polyamides include polyhexamethylene adipamide and aramids such as KEVLAR™, which is commercially available from E. I. duPont de Nemours and Company of Wilmington, Del. Nylon is the preferred polymeric matrix material.

Suitable thermoplastic polyurethanes are condensation products of a polyisocyanate material and a hydroxyl-containing material such as polyol and include, for example, ESTANE and TEXIN polyurethanes which are commercially available from B. F. Goodrich of Toledo, Ohio and Bayer, respectively.

Thermoplastic polyesters useful in the present invention include polyethylene terephthalate, polybutylene terephthalate and polypropylene terephthalate.

Useful vinyl polymers include polyvinyl chloride, polyvinylidene chloride (saran), polyvinyl fluoride, polyvinylidene fluoride, ethylene vinyl acetate copolymers, such as ELVAX which is commercially available from duPont, and polystyrenes such as DYLARK which is a maleic anhydride-modified styrene which is commercially available from Arco Chemical of Newtown Square, Pa.

Thermoplastic elastomeric materials useful as matrix materials in the present invention include styrene-butadiene rubbers, styrene-acrylontrile (SAN) copolymers such as LUSTRAN, which is commercially available from Monsanto of St. Louis, Mo., styrene-butadiene-styrene (SBS) copolymers and acrylonitrile-butadiene-styrene (ABS) copolymers, such as CYCOLAC or BLENDEX, which are commercially available from GE Plastics of Pittsfield, Mass.

Further examples of useful thermoplastic materials include polyimides including polyether imides such as Ultem, which is commercially available from GE Plastics; polyether sulfones, such as Victrex which is commercially available from ICI Americas, Inc. of Wilmington, Del.; polyphenyl sulfones such as Radel R which is believed to be commercially available from Amoco; polyetherketones including polyetheretherketones (PEEK) such as Ultra Pec, which is commercially available from BASF Corp. of Parsippany, N.J.; polyphenylene oxides such as Noryl, which is commercially available from G.E. Plastics; polyphenylene sulfides such as Ryton R which is commercially available from Phillips Chemical Co. of Houston, Tex.; polyacetals such as Celcon, which is commercially available from Hoechst Celanese Corp. of Chatham, N.J.; polyvinyl chlorides; and polycarbonates such as Lexan, which is commercially available from G.E. Plastics, and Makrolon, which is commercially available from Bayer. Also included as suitable thermoplastic materials are any of the above thermoplastics which are modified by an unsaturated monomer.

Matrix materials useful in the present invention can include thermosetting materials such as thermosetting polyesters, vinyl esters, epoxides, phenolics, aminoplasts, thermosetting polyurethanes, derivatives and mixtures thereof.

Suitable thermosetting polyesters include the AROPOL products which are commercially available from Ashland Chemical Inc. of Columbus, Ohio. Examples of useful vinyl esters include DERAKANE® products such as DERAKANE® 470-45, which are commercially available from Dow Chemical USA of Midland, Mich.

Useful epoxides contain at least one epoxy or oxirane group in the molecule, such as polyglycidyl ethers of polyhydric alcohols or thiols. Useful polyglycidyl ethers of polyhydric alcohols can be formed by reacting epihalohydrins and/or butadiene dioxide with polyhydric alcohols, such as dihydric alcohols, in the presence of an alkali condensation and dehydrohalogenation catalyst such as sodium hydroxide or potassium hydroxide. Useful epihalohydrins include epibromohydrin, dichlorohydrin and epichlorohydrin, which is believed to be preferred. Suitable polyhydric alcohols can be aromatic, aliphatic or cycloaliphatic. Non-limiting examples of aromatic polyhydric alcohols include phenols which are preferably at least dihydric phenols. Non-limiting examples of aromatic polyhydric alcohols useful in the present invention include dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)-1,1-ethane; bis(2-hydroxyphenyl)methane; 1,5-hydroxynaphthalene; 4-isopropylidene bis(2,6-dibromophenol); 1,1,2,2-tetra(p-hydroxy phenyl)-ethane; 1,1,3-tris(p-hydroxy phenyl)-propane; novolac resins; bisphenol F; long-chain bisphenols; and 4,4'-isopropylidenediphenol, i.e., bisphenol A. Bisphenol A is a particularly useful polyhydric alcohol.

Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2, 6-hexanetriol, erythritol and trimethylolpropane; and mixtures thereof. An example of a suitable cycloaliphatic alcohol is cyclohexanedimethanol.

Examples of suitable commercially available epoxides are EPON® 826 and 828 epoxy resins, which are epoxy functional polyglycidyl ethers of bisphenol A prepared from bisphenol-A and epichlorohydrin and are commercially available from Shell Chemical. Other examples of useful epoxy film-forming polymers are set forth in U.S. Pat. No. 4,752,527 of Sanzero et al., which is hereby incorporated by reference.

Non-limiting examples of suitable phenolics include phenol-formaldehyde and RESIMENE 841 melamine formaldehyde from Monsanto. Useful aminoplasts include urea-formaldehyde and melamine formaldehyde. Suitable thermosetting polyurethanes include BAYBOND XW-110, which is commercially available from Bayer and other thermosetting polyurethanes which are commercially available from Bayer and E. I. duPont de Nemours Co. of Wilmington, Del.

Other components which can be included with the polymeric matrix material and reinforcing material in the composite are, for example, colorants or pigments, lubricants or process aids, ultraviolet light (UV) stabilizers, antioxidants, other fillers, and extenders.

The amount of fiber strand included in the composite is preferably less than about 65 weight percent of the total weight of the composite, and more preferably less than about 45 weight percent.

The fiber strand reinforcing material can be dispersed in the matrix by hand or any suitable automated feed or mixing device which distributes the reinforcing material generally evenly throughout the polymeric matrix material. For example, the reinforcing material can be dispersed in the polymeric matrix material by dry blending all of the components concurrently or sequentially. Alternatively, the reinforcing material can be fed as a continuous strand into a melt impregnation die, pultruded, cut and molded.

The polymeric matrix material 26 and strand 10 can be formed into a composite 12, shown in FIG. 1, by a variety of methods which are dependent upon such factors as the type of polymeric matrix material used. Thermosetting polymeric matrix materials can be cured by the inclusion of crosslinkers in the matrix material and/or by the application of heat, for example. Suitable crosslinkers useful to crosslink the polymeric matrix material are discussed above. The temperature and curing time for the thermosetting polymeric matrix material depends upon such factors as the type of polymeric matrix material used, other additives in the matrix system and thickness of the composite, to name a few.

Reinforced polymeric composites can be formed from the polymeric matrix material, reinforcing material and any other desired components in a variety of ways. For example, for a thermosetting matrix material, the composite can be formed by compression or injection molding, pultrusion, filament winding, hand lay-up, spray-up or by sheet molding or bulk molding followed by compression or injection molding. For a thermoplastic matrix material, suitable methods for forming the composite include direct molding or extrusion compounding followed by injection molding. Useful extrusion equipment includes single or twin screw extruders commercially available from Werner & Pfleiderer as Model No. ZSK 30 and Welding Engineers, respectively. Methods and apparatus for forming the composite by the above methods is discussed in *Handbook of Plastic Materials and Technology* at pages 955–1062, 1179–1215 and 1225–1271, which are hereby incorporated by reference.

The method according to the present invention for reinforcing a polymeric matrix material comprises: (1) applying to a sized fiber strand reinforcing material the above aqueous secondary coating composition; (2) at least partially drying the aqueous secondary coating composition to form a substantially uniform coating upon the reinforcing material; (3) dispersing the reinforcing material in the polymeric matrix material; and (4) at least partially curing the polymeric matrix material to provide a reinforced polymeric composite in a manner such as is discussed in detail above. In addition, the method can comprise the step of at least partially drying the sized fiber strand prior to the step of applying the secondary coating composition.

The present invention will now be illustrated by the following specific, non-limiting example.

EXAMPLE

Each of the components in the amounts set forth in Table 1 were mixed to form aqueous sizing compositions (Samples 1 and 2) having the characteristics set forth in Table 1 for coating glass fibers with a secondary coating according to the present invention.

TABLE 1

| COMPONENT | SAMPLE 1 WEIGHT OF COMPONENT (grams) | SAMPLE 2 WEIGHT OF COMPONENT (grams) |
|---|---|---|
| fiber lubricant[1] | 0.175 | 0.175 |
| A-1100 silane[2] | 1.67 | 1.67 |
| acetic acid (80%) | 1 | 0.45 |
| water | 97.15 | 97.7 |
| pH | 4.7 | 8.3 |
| weight percent solids | 1.07 | 1.07 |

[1]EMERY ® 6760 partially amidated polyethylene imine fiber lubricant which is commercially available from Emery Henkel Corporation of Kankakee, Illinois.
[2]A-1100 is a gamma-aminopropyltriethoxysilane which is commercially available from OSi Specialties, Inc. of Danbury, Connecticut. The A-1100 was hydrolyzed with water and the pH adjusted with acetic prior to mixing with the other components.
[3]The fiber glass strand was sized with an aqueous sizing composition containing about 36% Neoxil 9851 polyester-based polyurethane, about 55% DISPEX™ A-40 polyacrylic acid, about 5% A-1100 coupling agent, about 2% Emery 6760 fiber lubricant and about 2% Synoeronic F-108 block copolymer of propylene oxide and ethylene oxide.

The aqueous sizing compositions of Samples 1 and 2 were applied in a conventional forming process to 210 tex, 10 micrometer average filament diameter E-glass fibers and dried to form glass fiber strands having a loss on ignition (LOI) of about 0.11 percent.

Comparative Example 1 was coated with a sizing composition[3] and had no secondary coating. The loss on ignition of Comparative Example 1 was about 0.83%. Comparative Examples 2 and 3 were coated with the sizing compositions of Samples 1 and 2, respectively and had no secondary coating. The loss on ignition for each of Comparative Examples 2 and 3 was about 0.11. Examples A–D according to the present invention were coated with the sizing compositions of Samples 1 and 2, dried and coated with secondary coating compositions as indicated in Table 2 below. The strands were direct chopped into about 4.5 millimeter lengths. The strands of the Comparative Examples were processed similarly to those of Examples A–D.

TABLE 2

| | EXAMPLES | | | |
|---|---|---|---|---|
| COMPONENTS | A | B | C | D |
| weight of urethane polymer[4] (grams) | 3.8 | 3.8 | 7.3 | 7.3 |
| weight of acrylic polymer[5] (grams) | 4.3 | 4.3 | 9.3 | 9.3 |
| weight of emulsifying agent[6] | 0.05 | 0.05 | 0.1 | 0.1 |
| SIZING COMPOSITION APPLIED | SAMPLE 1 | SAMPLE 2 | SAMPLE 1 | SAMPLE 2 |
| weight percent solids | 3.4 | 3.4 | 7.4 | 7.4 |
| loss on ignition (%) | 0.3 | 0.25 | 0.62 | 0.6 |

[4]Neoxil 9851 thermoplastic polyurethane which is commercially available from DSM Italia.
[5]DISPEX A-40 polyacrylic acid which was neutralized with ammonium hydroxide which is commercially available from Allied Colloids of Sussex, Virginia.
[6]SYNPERONIC F-108 polyoxypropylene-polyoxyethylene block copolymer.

Composites of the glass strands of Examples A–D and Comparative Examples 1–3 were compounded with ULTRAMID® A3 Nylon 66, which is commercially available from BASF Corp., using a Werner Pfleiderer 30 millimeter twin screw extruder and molded using a Battenfeld Model 750/315CD injection molding machine. The samples were prepared for the evaluation of physical properties according to the following ISO specifications: for Charpy impact strength—ISO 179; for Izod impact strength—ISO 180 and for tensile properties—ISO 527. The samples were also evaluated for color using a Dr. Lange calorimeter. The weight percent glass content for each sample and results of the physical property testing are set forth in Table 3 below.

TABLE 3

| | COMPARATIVE EXAMPLES | | | EXAMPLES | | | |
|---|---|---|---|---|---|---|---|
| PHYSICAL PROPERTY | 1 | 2 | 3 | A | B | C | D |
| CHARPY | | | | | | | |
| Unnotched impact strength (kJ/m$^2$) | 63 | 55 | 53 | 62 | 61 | 62 | 62 |
| Notched impact strength (kJ/m$^2$) | 14.2 | 11.6 | 12.0 | 14.0 | 13.5 | 13.3 | 13.1 |
| IZOD | | | | | | | |
| Unnotched impact strength (kJ/m$^2$) | 98 | 81 | 83 | 96 | 92 | 86 | 93 |
| Notched impact strength (kJ/m$^2$) | 13.5 | 11.3 | 11.6 | 13.6 | 13.0 | 12.5 | 12.8 |
| Tensile strength (MPa) | 208 | 201 | 200 | 213 | 210 | 201 | 201 |
| Tensile Modulus (GPa) | 10.6 | 10.0 | 10.2 | 10.4 | 10.5 | 9.7 | 9.7 |
| Elongation at break (%) | 3.7 | 3.4 | 3.5 | 3.5 | 3.4 | 3.8 | 3.9 |
| Flexural Strength (MPa) | 293 | 280 | 283 | 295 | 296 | 290 | 284 |
| Flexural Modulus (GPa) | 8.6 | 8.2 | 8.4 | 8.7 | 8.7 | 8.4 | 8.0 |
| Outer fiber strain at break (%) | 4.5 | 4.3 | 4.3 | 4.4 | 4.3 | 4.5 | 4.7 |
| COLOR | | | | | | | |
| L* | 60.4 | 56.2 | 57.0 | 56.6 | 56.4 | 58.5 | 59.1 |
| a* | −1.9 | −3.4 | −3.4 | −2.8 | −2.5 | −2.4 | −2.2 |
| b* | 11.3 | 9.3 | 9.7 | 10.5 | 11.0 | 10.9 | 10.5 |
| YI | 26.9 | 21.7 | 22.4 | 25.3 | 27.0 | 26.1 | 25.2 |
| WI | 1.6 | 4.0 | 3.7 | 1.8 | 0.7 | 1.7 | 2.8 |

TABLE 3-continued

| PHYSICAL PROPERTY | COMPARATIVE EXAMPLES | | | EXAMPLES | | | |
|---|---|---|---|---|---|---|---|
| | 1 | 2 | 3 | A | B | C | D |
| Glass content (weight percent) | 31.4 | 29.9 | 30.7 | 31.2 | 31.3 | 29.6 | 29.1 |

As shown in Table 3, the physical properties for test samples of glass fibers coated with a secondary coating composition according to the present invention (Examples A–D) are comparable to those of the Comparative Examples coated with only a sizing composition for composites formed using Nylon 66 matrix material.

From the foregoing description, it can be seen that the present invention comprises coated fiber strands which provide less expensive, simplified reinforcement for composites formed from thermosetting and thermoplastic polymers, such as nylon, while providing adequate physical properties. Such coated glass fibers can be used in a number of applications in which strength, modulus and impact resistance are needed.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, I claim:

1. A fiber strand adapted to reinforce a polymeric matrix material, at least a portion of a surface of the fiber strand having applied thereto a primary coating of a sizing composition and thereupon an aqueous secondary coating composition, the aqueous secondary coating composition comprising:
   (a) a urethane-containing polymer; and
   (b) a polymer prepared by addition polymerization of a monomer selected from the group consisting of acrylic acid, methacrylic acid and a mixture thereof,
the aqueous coating composition being free of acrylic latex, the aqueous coating composition being different from the sizing composition.

2. The fiber strand according to claim 1, wherein the primary coating of the sizing composition is present as an at least partially dried residue upon the portion of the surface of the fiber strand.

3. The fiber strand according to claim 1, wherein the aqueous secondary coating is present as a dried residue upon the portion of the surface of the fiber strand.

4. The fiber strand according to claim 1, wherein the fiber strand is formed from a material selected from the group consisting of inorganic materials, natural materials, thermoplastic materials and thermosetting materials.

5. The fiber strand according to claim 4, wherein the fiber strand is formed from an inorganic material which comprises glass fibers.

6. The fiber strand according to claim 4, wherein the fiber strand is formed from a thermoplastic material selected from the group consisting of polyolefins, polyamides, polyurethanes, polyesters, acrylic polymers, vinyl polymers, acetals, polyaryl sulfones, polyether sulfones, polyimides, polyetherketones, polyphenylene oxides, polyphenylene sulfides, polycarbonates, derivatives and mixtures thereof.

7. The fiber strand according to claim 4, wherein the fiber strand is formed from a thermosetting material selected from the group consisting of polyesters, vinyl esters, epoxides, phenolics, aminoplasts, polyurethanes, derivatives and mixtures thereof.

8. The fiber strand according to claim 1, wherein the urethane-containing polymer of the secondary coating composition is a condensation reaction product of a polyfunctional isocyanate-containing material and a hydroxyl-containing material.

9. The fiber strand according to claim 8, wherein the polyfunctional isocyanate-containing material is a difunctional isocyanate selected from the group consisting of toluene diisocyanate, phenylene diisocyanate, dianisidine diisocyanate, diisocyanatodiphenyl methane, bis(p-phenyl isocyanate), bis(p-phenyl) methylene diisocyanate, bis(p-phenyl cyclohexyl) methylene diisocyanate, naphthalene diisocyanate, xylylene diisocyanate, tetramethylxylylene diisocyanate, cyclohexane diisocyanate, hexamethylene diisocyanate, isophorone diisocyanate and dicyclohexylmethane-4,4'diisocyanate.

10. The fiber strand according to claim 8, wherein the hydroxyl-containing material is a polyhydric alcohol selected from the group consisting of a polyester polyol and a polyether polyol.

11. The fiber strand according to claim 1, wherein the urethane-containing polymer of the secondary coating composition comprises about 1 to about 60 weight percent of the secondary coating composition on a total solids basis.

12. The fiber strand according to claim 1, wherein the polymer (b) of the secondary coating composition has at least one acid functional group which is neutralized with ammonium hydroxide.

13. The fiber strand according to claim 1, wherein the polymer (b) of the secondary coating composition comprises about 40 to about 95 weight percent of the aqueous coating composition on a total solids basis.

14. The fiber strand according to claim 1, wherein the secondary coating composition further comprises a coupling agent.

15. The fiber strand according to claim 1, wherein the secondary coating composition further comprises a fiber lubricant.

16. A fiber strand adapted to reinforce a polymeric matrix material, at least a portion of a surface of the fiber strand having applied thereto a primary coating of a sizing composition and thereupon an aqueous secondary coating composition, the aqueous secondary coating composition comprising:
   (a) a urethane-containing polymer; and
   (b) a polymer prepared by addition polymerization of (1) a monomer selected from the group consisting of acrylic acid, methacrylic acid and a mixture thereof; and (2) an addition polymerizable unsaturated carboxylic acid adapted to form a polymer with the monomer, the polymer having at least one acid functional carboxyl group and being neutralized with a base, the aqueous coating composition being essentially free of acrylic latex, the aqueous coating composition being different from the sizing composition.

17. The fiber strand according to claim 16, wherein the urethane-containing polymer of the secondary coating composition is a condensation reaction product of a polyfunctional isocyanate-containing material and a hydroxyl-containing material.

18. The fiber strand according to claim 17, wherein the polyfunctional isocyanate-containing material is a difunctional isocyanate selected from the group consisting of toluene diisocyanate, phenylene diisocyanate, dianisidine diisocyanate, diisocyanatodiphenyl methane, bis(p-phenyl isocyanate), bis(p-phenyl) methylene diisocyanate, bis(p-phenyl cyclohexyl) methylene diisocyanate, naphthalene diisocyanate, xylylene diisocyanate, tetramethylxylylene diisocyanate, cyclohexane diisocyanate, hexamethylene diisocyanate, isophorone diisocyanate and dicyclohexylmethane-4,4'diisocyanate.

19. The fiber strand according to claim 17, wherein the hydroxyl-containing material is a polyhydric alcohol selected from the group consisting of a polyester polyol and a polyether polyol.

20. The fiber strand according to claim 16, wherein the urethane-containing polymer of the secondary coating composition comprises about 1 to about 60 weight percent of the secondary coating composition on a total solids basis.

21. The fiber strand according to claim 16, wherein the base is ammonium hydroxide.

22. The fiber strand according to claim 16, wherein the polymer (b) of the secondary coating composition comprises about 40 to about 95 weight percent of the aqueous coating composition on a total solids basis.

23. The fiber strand according to claim 16, wherein the secondary coating composition further comprises a coupling agent.

24. The fiber strand according to claim 16, wherein the secondary coating composition further comprises a fiber lubricant.

* * * * *